(12) United States Patent
Weiner et al.

(10) Patent No.: US 11,284,130 B2
(45) Date of Patent: Mar. 22, 2022

(54) DYNAMIC INSERTION OF CONTENT WITHIN LIVE STREAMING VIDEO

(71) Applicant: GumGum, Inc., Santa Monica, CA (US)

(72) Inventors: Ken Weiner, Los Angeles, CA (US); Jagadish Kamath, Karnataka (IN)

(73) Assignee: GumGum, Inc., Santa Monica, CA (US)

( * ) Notice: Subject to any disclaimer, the term of this patent is extended or adjusted under 35 U.S.C. 154(b) by 0 days.

(21) Appl. No.: 17/175,194

(22) Filed: Feb. 12, 2021

(65) Prior Publication Data

US 2021/0168416 A1 Jun. 3, 2021

Related U.S. Application Data

(63) Continuation-in-part of application No. 16/899,305, filed on Jun. 11, 2020.

(Continued)

(51) Int. Cl.
*H04N 21/234* (2011.01)
*H04N 21/2187* (2011.01)
(Continued)

(52) U.S. Cl.
CPC ... *H04N 21/23424* (2013.01); *H04N 21/2187* (2013.01); *H04N 21/233* (2013.01);
(Continued)

(58) Field of Classification Search
CPC .............................................. H04N 21/23424
See application file for complete search history.

(56) References Cited

U.S. PATENT DOCUMENTS

| | | |
|---|---|---|
| 8,863,182 B1 | 10/2014 | Sharifi et al. |
| 9,204,102 B2 | 12/2015 | Ahanger et al. |

(Continued)

FOREIGN PATENT DOCUMENTS

| | | |
|---|---|---|
| WO | WO 2015/159289 | 10/2015 |
| WO | WO 2020/252204 | 12/2020 |

OTHER PUBLICATIONS

International Search Report and Written Opinion—PCT/US2020/037300—dated Sep. 3, 2020.

(Continued)

*Primary Examiner* — Michael H Hong
(74) *Attorney, Agent, or Firm* — Knobbe, Martens, Olson & Bear, LLP

(57) ABSTRACT

Systems and methods are described for server-side manipulation of underlying video content in order to dynamically place overlay content or other supplemental content within a video stream in a manner whereby a viewing user sees the advertisement content over or integrated within a portion of the base video content. Segments of the original video file may be modified by a server to display overlay content over a portion of the original content or integrated within the portion of the original content, and revised manifest data may be generated by the server and sent to a client device for playback. The systems and methods may include introducing a delay in the live stream relative to its original source (Continued)

in order to provide time for server-side creation of replacement video portions that include overlay content or other supplemental content.

20 Claims, 8 Drawing Sheets

Related U.S. Application Data

(60) Provisional application No. 62/861,629, filed on Jun. 14, 2019.

(51) Int. Cl.
    *H04N 21/239*     (2011.01)
    *H04N 21/233*     (2011.01)
    *H04N 21/81*     (2011.01)
    *H04N 21/235*     (2011.01)
    *H04N 21/2668*     (2011.01)
    *H04N 21/262*     (2011.01)

(52) U.S. Cl.
    CPC ....... *H04N 21/235* (2013.01); *H04N 21/2393* (2013.01); *H04N 21/2625* (2013.01); *H04N 21/2668* (2013.01); *H04N 21/812* (2013.01)

(56) References Cited

U.S. PATENT DOCUMENTS

| | | |
|---|---|---|
| 9,426,543 B1 | 8/2016 | Li et al. |
| 9,467,750 B2 | 10/2016 | Banica et al. |
| 9,973,830 B1 | 5/2018 | Shetty |
| 10,638,180 B1* | 4/2020 | Pringle ............ H04N 21/23424 |
| 2012/0198492 A1 | 8/2012 | Dhruv et al. |
| 2016/0173961 A1 | 6/2016 | Coan et al. |
| 2016/0345074 A1* | 11/2016 | Serbest ................. H04L 67/306 |
| 2017/0339114 A1 | 11/2017 | Watson et al. |
| 2018/0097864 A1 | 4/2018 | Brinkley et al. |
| 2019/0075371 A1 | 3/2019 | Parampath et al. |
| 2020/0204849 A1* | 6/2020 | Loheide ............ H04N 21/8106 |
| 2020/0396521 A1 | 12/2020 | Weiner et al. |

OTHER PUBLICATIONS

Grenager, Teg, Video Ad Serving Template (Vast) Version 3.0—Jul. 12, 2012—available at https://www.iab.com/wp-content/uploads/2015/06/VASTv3_0.pdf.

* cited by examiner

DYNAMIC INSERTION OF CONTENT WITHIN LIVE STREAMING VIDEO

CROSS-REFERENCE TO RELATED APPLICATIONS

This application is a continuation-in-part of U.S. patent application Ser. No. 16/899,305, filed Jun. 11, 2020, which claims priority to U.S. Provisional Application No. 62/861,629, filed on Jun. 14, 2019, the entirety of which are each hereby incorporated herein by reference.

BACKGROUND

There are a variety of approaches and formats for streaming video content over a network, such as the Internet. For example, two common formats for video streaming are HTTP Live Streaming (HLS) and Dynamic Adaptive Streaming over HTTP (DASH). These and other streaming video approaches often involve storing video content on a server or content delivery network (CDN) in a number of small segments or chunks, such as segments having a playback length between two to ten seconds, depending on the implementation used in a given instance. A manifest file (sometimes referred to as simply a manifest) describes the chunks or segments available for streaming from a given source, including location information such as uniform resource locators (URLs), and may include information regarding various audio and video qualities available (e.g. different resolutions, bitrates, etc.). Different manifest or index data may be associated with different video encoding or bitrates, such that a video player may switch between chunks of different quality depending on bandwidth and/or other considerations during video playback.

Steaming video may be presented with inserted advertisements, such as using Dynamic Ad Insertion (DAI) techniques. Video ads for insertion within a content stream may be delivered to a client device separately from delivery of the base content, with the client-side player handling proper timing and insertion into the video playback, or the video ads may be integrated into the video stream on the server side using server-side ad insertion (SSAI) techniques. SSAI, which may in whole or in part be referred to as ad stitching in some contexts, often involves a combination of manifest manipulation, ad server communication, and ad bitrate and resolution normalization, which all would typically happen on the server side before presenting a manifest to a client device.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1A:
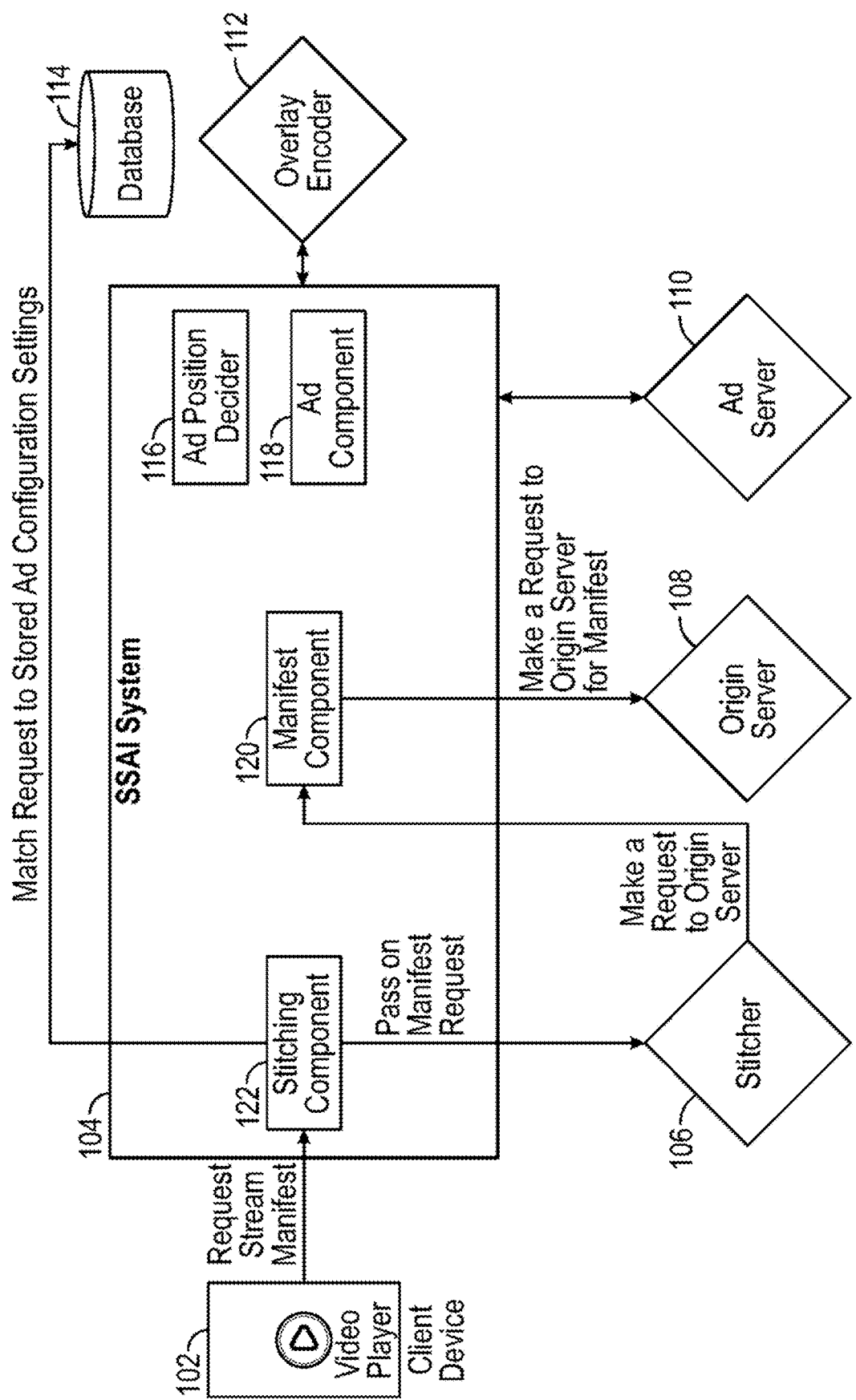
FIGS. 1A and 1B are system diagrams illustrating data flow for implementing aspects of the present disclosure, according to some embodiments.

Existing uses of SSAI include inserting a commercial or other video advertisement within a streaming video (such as a movie, show, or a live stream) on the server side in a manner whereby the resulting stream played on the client device appears similar to a traditional commercial break. For example, in existing SSAI approaches, the base video content, such as a movie or show, is interrupted for a full screen advertisement, then the base content resumes after the advertisement ends, such that the client device is presenting either advertisement content or the base video content at a given moment (but not showing both simultaneously at any time). In contrast to existing SSAI approaches, aspects of the present disclosure relate to server-side manipulation of the underlying video content (such as a show, movie, or a live stream that a user is watching) in order to dynamically place an overlay advertisement or other overlay content within the video stream in a manner whereby a user sees the advertisement content over or integrated within a portion of the base video content (such as within a bottom third of the screen or other subsection of the display) without a pause or commercial break in playback of the base content. From the perspective of the client device that presents the video stream, the stream appears to be a single video stream similar to how the client device would process streaming video that does not include an advertisement.

Advantages of the approaches disclosed herein to the user include that the user may continue to watch the underlying video content of interest while an advertisement is displayed, rather than need to wait for a full-screen commercial or advertisement to play prior to starting or resuming playback of the underlying video of interest to the user. Advantages to content publishers, advertisers and others include that advertisements or other supplemental content added via server-side insertion approaches disclosed herein may be technically challenging for client-side software or browser extensions (such as "ad blockers") to recognize and block from playback. For example, an overlay advertisement that is added over playback of underlying video content on the client side may be blocked in a number of manners by simply not displaying the separate overlay content, whereas techniques described herein in accordance with some embodiments may result in overlay content that is incorporated within the individual video frames on the server side (e.g., modifying or replacing actual pixel data of the base video content prior to delivery of the video content to the client device).

For example, a video publisher, such as a company that wants to offer ad-supported streaming video content to viewing users, may establish a relationship with an SSAI platform described herein in order for the SSAI platform to dynamically insert advertisements within the publisher's video content. The video content may be presented to end-users or viewers via a video player that plays videos on a client device. The player may be provided within a web browser, a mobile application operating on a smartphone or tablet, a connected TV, and/or other over-the-top (OTT) or video playback environment. The video content that a user views via a video player may be supplied to the client device over a network, such as the Internet, as a HLS or DASH manifest URL or file, in some embodiments.

Existing methods of SSAI typically involve presenting linear ads, which may be a video ad that is inserted as a "pre-roll" ad displayed prior to presentation of the video content or a mid-roll ad that is inserted somewhere in the middle of the video content (such that the underlying video pauses, and will not be presented or resumed until the mid-roll ad completes presentation). Aspects of the present disclosure enable SSAI support for an overlay ad, which may be a non-linear ad that appears as an overlay on top of or within the display of the underlying video content. Accordingly, the underlying video content may appear to the user to continue to play as normal with opaque or translucent overlaid content (either static or itself animated or video content) covering a portion of the underlying video. For example, these overlay ads may contain an alpha channel with transparency.

As will be further discussed, the ads or other supplemental content described herein may be provided in association with on-demand video content that is available from a streaming source for playback at any time desired by a user (such as a traditional streaming video source that provides on-demand movies or other videos, for example), or may be live streaming video content (such as video content being created in a substantially live or real-time manner relative to when it is viewed by end users). In some embodiments, systems and methods that will be described further below may, with respect to live streaming video uses, include introducing a slight delay (such as a 10 second delay) in a live stream relative to its original source in order to provide time for server-side creation of replacement video portions that include overlay content or other supplemental content.

According to some embodiments, the presence and timing of overlay ads added in the manner described herein are not discernible by the client device's video player or any associated ad blocking software. While advertisements (ads) are often used as an example herein, it will be appreciated that any supplemental image, text or video content could be integrated within frames of original video segments according to methods described herein. For example, the overlay content or other supplemental content could be informational as opposed to promotional.

Figure 1B:
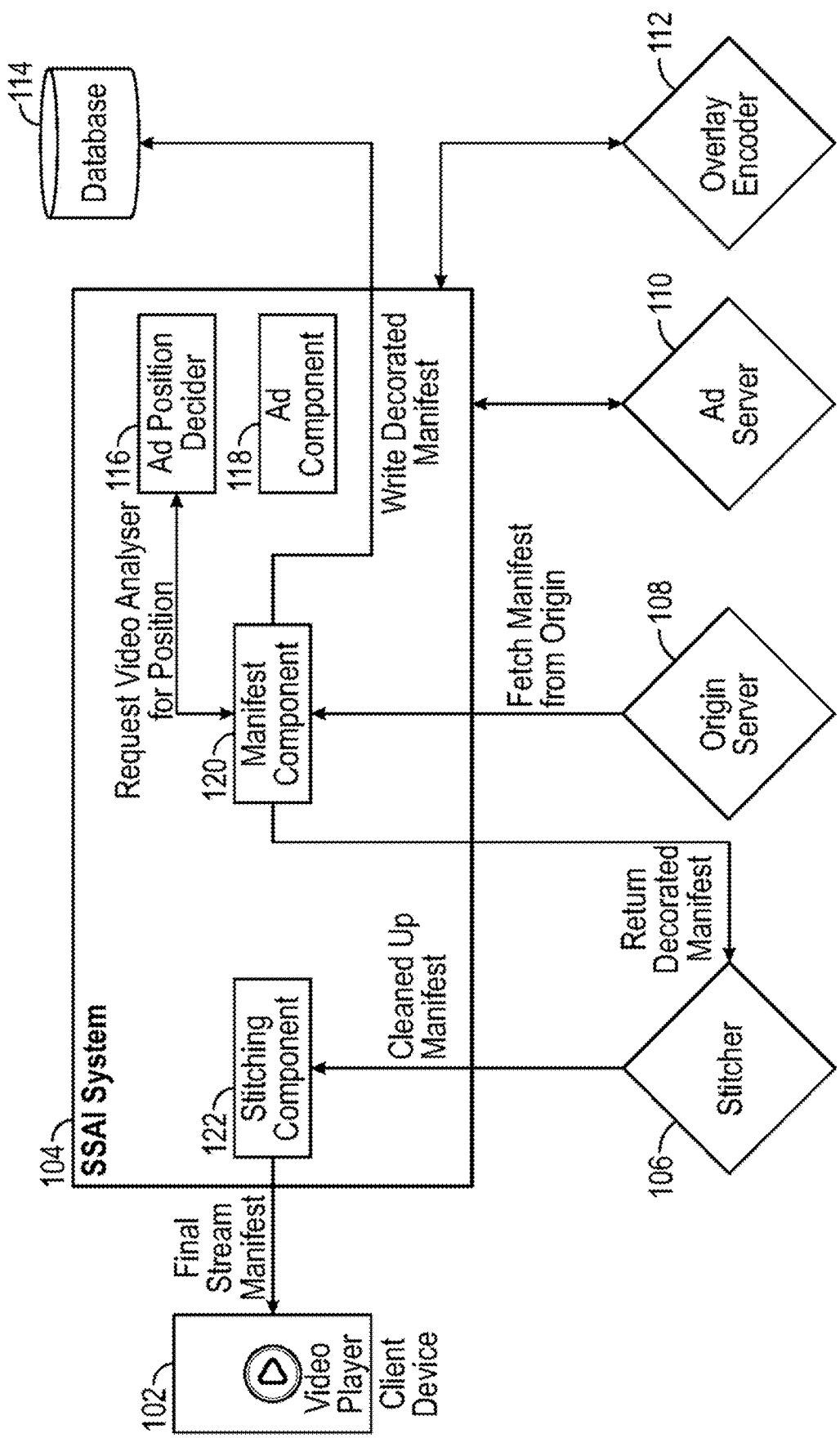

FIGS. 1A and 1B are system diagrams illustrating data flow for implementing aspects of the present disclosure, according to some embodiments. As illustrated in FIG. 1A, a client device 102 (such as a desktop computer, laptop computer, smartphone, tablet device, or other computing device) of a user who wants to view streaming video content on a video player operating on the client device 102 may send a stream manifest request to the SSAI platform or system 104. The request may be over a network, such as the Internet. It will be appreciated that the video player may be implemented within a web browser, may be a stand-alone video player application (such as operating on a mobile phone, tablet computer or other personal computer), may be a proprietary application of a particular third-party publisher or video platform, may be implemented within a television, and/or other application. The SSAI system 104 may be an Internet-accessible server, service, system or platform that provides advertisement integration within videos across a wide variety of video publishers. For example, the client device 102 may be presenting a webpage of a first publisher to the user of the device that includes an embedded video player that is requesting to load streaming content identified by the given stream manifest referenced in code associated with the page.

Figure 3:
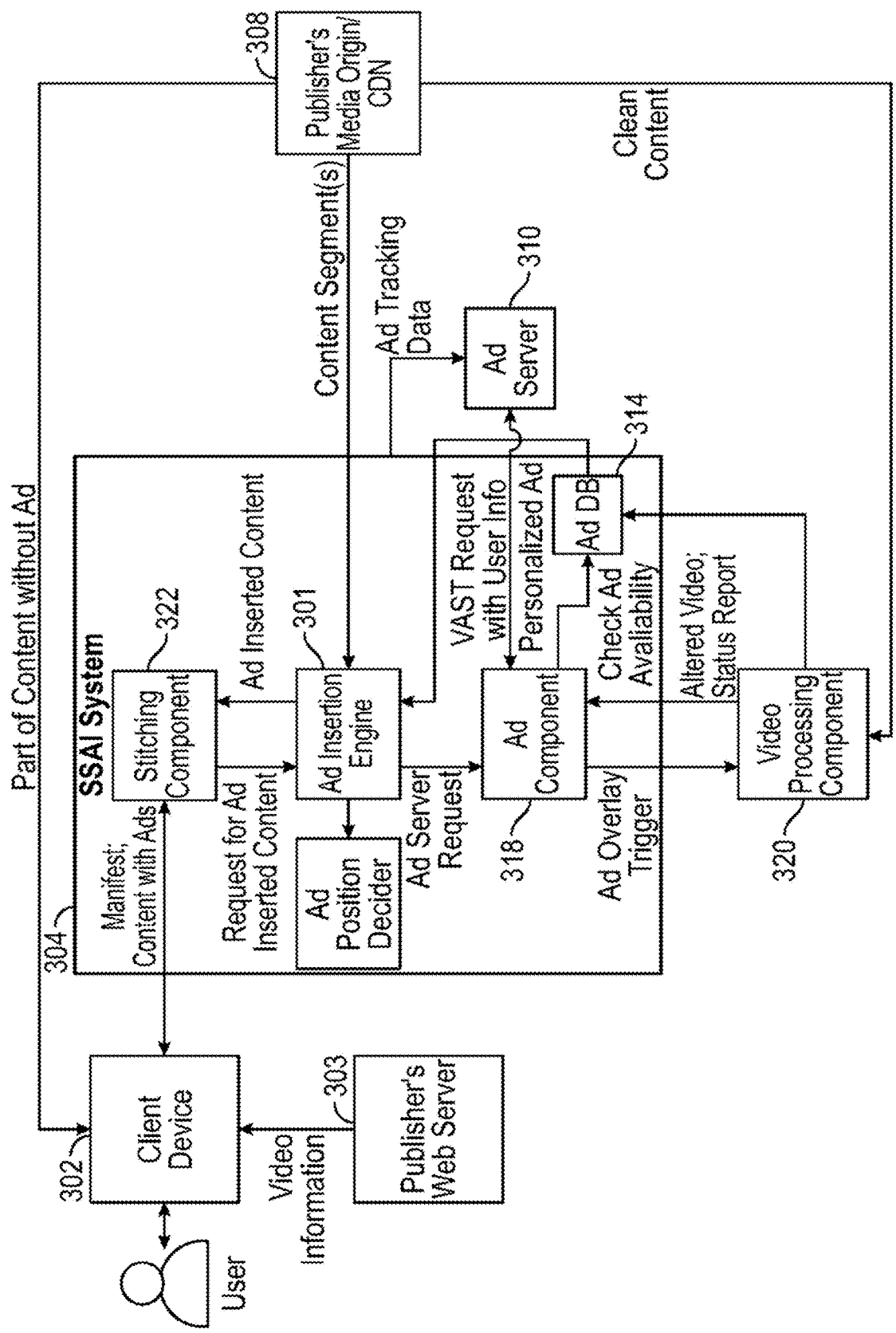
FIG. 3 illustrates example data flow, according to one embodiment, for delivering video content and associated overlay advertisement content for playback on a client device.

The stitching module or component 122 (which may be considered a stitching layer, in some embodiments) of the platform 104 may match the request with a configuration file in database 114, and may also pass on the manifest request to a stitcher service or component 106 (which may be internal or external to the platform 104). While the stitcher is illustrated as external to the SSAI system 104 in FIG. 1A, in some embodiments, the stitcher may be a component within the SSAI system 104. For example, functionality of the stitcher 106 and manifest component 120 may be provided by an advertisement insertion engine that is internal to the SSAI system (as shown in FIG. 3, discussed below).

The configuration file may initialize the instance of the platform based on various parameters configured in the configuration file, which may be specific to a given manifest request and/or publisher. For example, the configuration file (or config file) may include a set of rules created to govern advertisement insertion for a certain set of videos owned by a given content owner, such as a particular publisher or host of a page or service that the client device has accessed. The parameters in a configuration file may be one-time parameters (OTP), such as in a JSON format. The parameters may include information regarding databases or other data sources containing various files that will be used in generating the combined video content, media stitcher configuration information, information associated with an overlay encoder 112, HTTP server parameters, database credentials, logging parameters, origin server URL, ad decision server (ADS) information, advertisement type information (e.g., overlay, insertion, replacement, or other), ad position (e.g., random, periodic, analysis-based, or other), and/or other configuration data. The configuration file or data record may be identified by a configuration key included in a URL or URI received from the client device. This URL may be, for example, a URL associated with the SSAI platform that mirrors the path or URL for the underlying video asset (which may be hosted by the publisher or an associated CDN, but is hosted by the SSAI platform and includes the configuration key.

The stitcher service, after receiving the manifest request, may retrieve the requested manifest from an associated origin server 108 or other video source, such as via a manifest layer or component 120 of the platform 104. In some instances, the origin 108 may be a content delivery network (CDN) used by the given video publisher. The retrieved or fetched original video content may then be returned to the video player on the client device (not pictured in FIG. 1A), while the SSAI system analyzes the content for determining locations to insert or overlay advertisements or other supplemental content, as will be further discussed below.

Continuing to FIG. 1B, which illustrates further data flow following that described above with respect to FIG. 1A, the original manifest retrieved from the origin server 108 may be processed by the manifest component 120 for decoration or modification. The manifest component 120 may query the ad position decider 116 for an ad position, which may be a timestamp in the video at which an advertisement should be inserted as overlay content or other content integrated within frames of the video. The ad position decider may analyze the video and provide ad positions (such as timestamps or other position information) for the video. The ad positions may be determined based on metadata without analyzing the actual video data itself, or may be include analysis of the video file itself (such as image analysis of individual frames), depending on the embodiment. For example, the ad positions may be based on stored rules (such as time between ads), original manifest information, video content analysis (such as object detection within video frames), analysis of sound in the videos (e.g., to detect a pause in action), and/or other manners. The manifest is then decorated with the ad position information. The decorated manifest is stored in database 114 for future use and also returned to the stitcher 106. The ad positions may be encoded as, for example, to include an event_id and unique_program_id.

The stitching service 106 may then identify when to insert an ad in the video based on the decorations present in the revised manifest. The stitcher may perform a stitching job, as will be further described below, and then return a clean manifest to the stitching component 122, which may in turn return the clean manifest to the client device 102 for playback of the video content by the video player. As will be further described below, the stitching component 106 may further rely on an overlay encoder 112 and ad server 110 (which may be referenced as an ADS, or ad decision server, in some embodiments).

Figure 2:
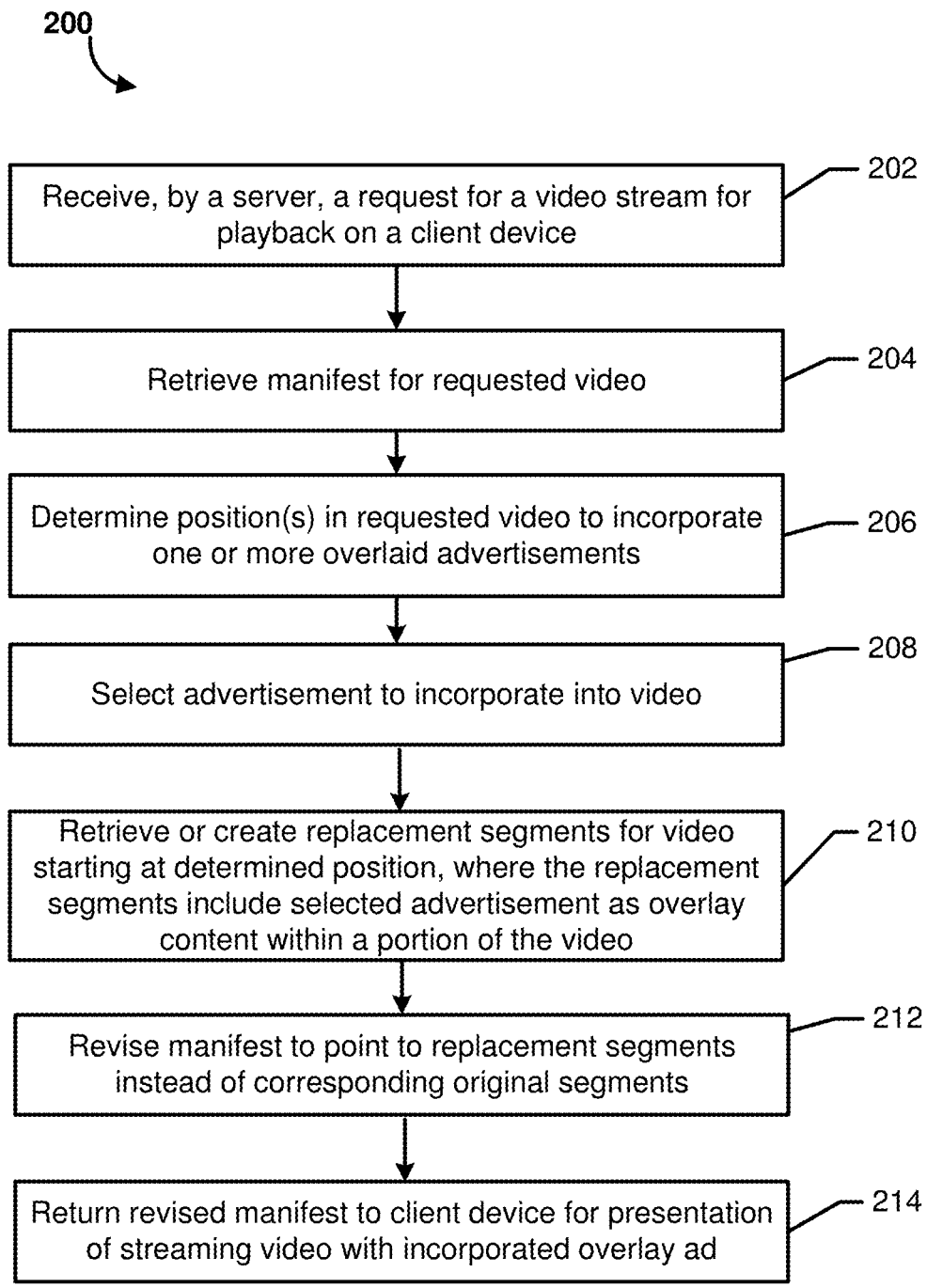
FIG. 2 is a flow diagram of an illustrative method for providing streaming video with overlaid advertisement content to a client device.

FIG. 2 is a flow diagram of an illustrative method 200 for providing streaming video with overlaid advertisement content to a client device. The illustrative method 200 may be implemented by a server or platform, such as SSAI system 104 described above or computing system 302 described below, or by a number of computing systems performing different blocks. For ease of description, the blocks will be described below as being performed by the SSAI platform 104 (which may also be referenced below as a computing system).

The illustrative method 200 begins at block 202, where the platform receives, from a client device over a network, a request for a video for streaming playback on the client device. At block 204, the platform may then retrieve a manifest file corresponding to the requested video from local or remote storage. In some embodiments, the manifest may have been previously stored by the platform, while in other embodiments the manifest may be retrieved from storage associated with a partner publisher service.

At block 206, the platform may determine one or more positions in the video at which to incorporate an advertisement, such as an overlay or non-linear advertisement. In some embodiments, the positions may be determined from previously stored tags or other information, or may be dynamically determined based on analysis of the video and/or associated metadata, as described above. The platform may then, at block 208, select advertisement content based on the video, the manifest file, client device information, the viewing user, the publisher, ad keywords associated with the video or page on which the video appears, and/or other factors known in the field of online advertising. In some embodiments, the advertisement may be selected by a third-party advertisement service, network or platform based on information passed to the third-party advertisement service by the SSAI platform (such as information regarding the client device, the video, a user of the client device, and/or other information known in the field of online advertising).

At block 208, the platform may retrieve or create replacement segments or chunks for the original video starting at the determined ad insertion position (such as video chunks or segments for a 30 second portion of the original video in which a 30 second ad is to be overlaid). For example, the platform may first check whether the selected ad has previously been placed by the platform at the selected positon in the given underlying video content (e.g., whether this given 30 second ad has previously been overlaid within the same 30 second portion of the original video content for delivery to a prior user), such that replacement segments that include the relevant portions of underlying video with the selected ad overlaid within the video may already be generated and stored in a database, CDN or other repository.

If the given original video segments have not been previously modified for the selected ad, the platform may retrieve the relevant original video portion(s) from the video in which to insert overlay content. The relevant portion(s) of the original video may be retrieved as a set of consecutive chunks or segments (e.g., based on URL(s) or other segment information in the manifest) or by extracting the relevant portion of video from a longer master file for the original video content, such as a mezzanine file.

If instead the combination of selected overlay content and underlying original video have not been previously generated and stored, the platform may generate the replacement segments of the video, where the replacement segments depict a section or portion (e.g., a one minute section of the original video) with the selected advertisement content overlaid over the original video content or otherwise integrated into the portion (such as in an augmented reality view where the content appears to be within a real world environment depicted in the underlying video). The overlay pixel data may be incorporated within the pixel data of each frame of the relevant frames of the underlying video such that that a plurality of individual video frames within the replacement segments each depict both advertisement content and original content of the video within the same frame. For example, an advertiser's logo and/or associated video advertisement content may appear in a bottom corner of the underlying video, as a banner or ticker along the bottom of the video, appearing to interact with an object in the underlying video, and/or in another manner.

The replacement content may be generated using an overlay encoder of the platform that receives a video fragment or section (which may be a collection of segments or chunks) of the underlying original video as one input, and receives an advertisement image or video as a second input, and outputs a replacement fragment or section of the original video that incorporates the advertisement content. The overlay encoder may also receive other inputs, such as an indication of where (e.g., in-frame positioning) in the video the advertisement should be displayed (e.g., top_left, top_centre, top_right, bottom_right, etc.), the size that the advertisement should appear, translucency levels, etc. In some embodiments, the encoder may output and store the modified video in one or more known mezzanine formats. The audio from the original video may be retained without modification in the replacement video, in some embodiments, but may be synchronized to the corresponding video content in replacement video segments.

At block 212, the platform may generate a revised manifest file that includes references to the replacement segments instead of corresponding original segments of the video. For example, the revised manifest may reference chunks or segments of the generated overlay segments from block 210 (such as by referencing a URL or other location of the segments) in place of prior references to corresponding segments or chunks of the original video. At block 214, the platform may then send, such as over the Internet or other network, the revised manifest file to the client device for presentation of streaming video that will include the overlay ad content. For example, processing of the revised manifest by a video player on the client device may cause the client device to present in sequence (a) a first original portion of the video, (b) a second portion of the video that was modified by the platform to include overlaid advertisement content within the second portion, and (c) a third original portion of the video. It will be appreciated that the SSAI platform may include multiple advertisements or other supplemental content (whether as overlay content or otherwise) during playback of a given video stream to a particular user. For example, the "second portion of the video" mentioned above could include multiple advertisements presented within different sets of frames of the second portion of the video, prior to presenting the third original portion of the video. As another example, the SSAI platform may integrate a second advertisement in a fourth portion of video that follows the "third original portion" referenced above.

FIG. 3 illustrates example data flow, according to one embodiment, for delivering video content and associated overlay advertisement content for playback on a client device. The majority of steps illustrated in FIG. 3 have previously been described above. Some additional details are provided in FIG. 3 with respect to the stitching operations, advertisement tracking, and other components or steps. The illustrated embodiment begins with a client device 302 receiving video information (such as a URL of a video) from a publisher's server 303. For example, the user of the client device may be accessing a website hosted by the publisher's server that includes a video embedded or referenced in the page. The publisher may have arranged for the video request to point to the SSAI system (such as via a mirrored path, as described above) for retrieval of a manifest file that will enable the client device to retrieve and play video content.

Once the SSAI system 304 receives a manifest request from a client device 302, the stitching component 322 may send a request for ad-inserted content from an ad insertion engine 301 (which may, in the embodiment illustrated in FIG. 3, implement functionality provided by other elements described above with respect to embodiments in FIGS. 1A and 1B, such as functionality provided by the manifest component and stitcher). The SSAI system 304 may then communicate with an ad server 310 (such as a server associated with a third-party advertisement service) or an internal advertisement source to request an advertisement. For example, as illustrated, the ad component 318 may receive the ad server request from the ad insertion engine 301 (as well as other information, such as the original manifest) and retrieve a video ad serving template (VAST) from the ad server 310, ADS or other ad source. The request may additionally include information about the client device 302 and/or the user of the client device 302 for advertisement selection or targeting purposes.

The VAST may be a file or script that provides various advertisement-related information, such as information regarding which ad to play, how the ad should appear, how long the ad should last, whether users are able to skip the ad, and/or other information or player instructions. For each unique combination of original content portion and advertisement selected, a request is sent to the video processing component 320 to generate replacement video segments that include the advertisement content integrated within the original video segments over a series of video frames. The ad database 314 may maintain records of all replacement video segments generated by the video processing component (e.g., indexed by advertisement identifier and underlying video timestamps) such that the ad component can retrieve previously cached replacement segments without requiring the video processing component to generate new video segments in some instances. This information regarding generated and stored replacement video segments may be updated via status reports sent from the video processing component 320 to the ad component 318 and/or ad database 314.

An overlay encoder or video processing component 320 may generate the revised portion(s) of original video content with the overlay ad therein (as described above), which is stored in mezzanine file storage, internal database 314 or another repository, and also provided back to the ad component 318. The video processing component may retrieve the underlying video segments from the publisher's media origin server or CDN 308 (such as based on the original manifest) and then integrate the advertisement content therein using stitching methods. It will be appreciated that the advertisement may be selected based on the user or the content of the advertisement could be generated to be personalized to the particular user, but neither is required. In some embodiments, there may be several video processor worker instances to handle concurrent overlay load. For example, the overlay content generation may take some time (e.g., seconds or minutes, in some embodiments depending on various factors). Accordingly, the video processor may continue to update the ad component regarding a current percentage completion of each job, then may send a "complete" signal or indicator when 100% of the processing is completed and the replacement video content is ready for providing to a client device. Accordingly, the ad-inserted content may then be returned to the stitching component 322 for delivery to the client device 302 for playback when indicated in the revised manifest provided to the client device.

As described above, when the client device 302 processes a revised manifest, the client device may be directed to alternatively at any given point in the playback (based on the manifest) either stream original content fragments from a content origin server 308 (e.g., original video content portions not including advertisement display) or overlay ad segments (e.g., segments including original content with an ad overlay) from the SSAI system or related server in a seamless manner. In some embodiments, the source of the ad-inserted content and the original video content may be the same physical source, but have different URLs.

During the time that the user watches an ad-inserted video segment or soon after, the SSAI system 304 may report advertisement tracking information to the ad server 310. While traditional advertisement tracking relies on information sent from an advertisement service directly to a client device, such as tracking pixels, the SSAI system 304, in some embodiments, may not pass any tracking pixels from the ad server 310 to the client device 302. From the perspective of the client device, segments of the video content that include advertisement content within a portion of each video frame over a given time period in the video may be indistinguishable from a technical perspective from the non-overlaid part of the content. For example, the difference may be seen through human viewing of the video or through substantive image analysis of the video frames, but not identifiable in an automated manner from the manifest, URLs or any code provided to the client device (e.g., as may be typically performed by ad-blocking software). However, because the SSAI system maintains records of which segments of the content include advertisements (which were placed therein by the SSAI system) and the time at which the client device 302 receives those segments for playback, the SSAI system may be configured to automatically send appropriate tracking data back to the ad server 310 identifying that a particular advertisement was served to a client (e.g., the SSAI system may fire a tracking pixel associated with the ad to the ad server 310).

Figure 4:
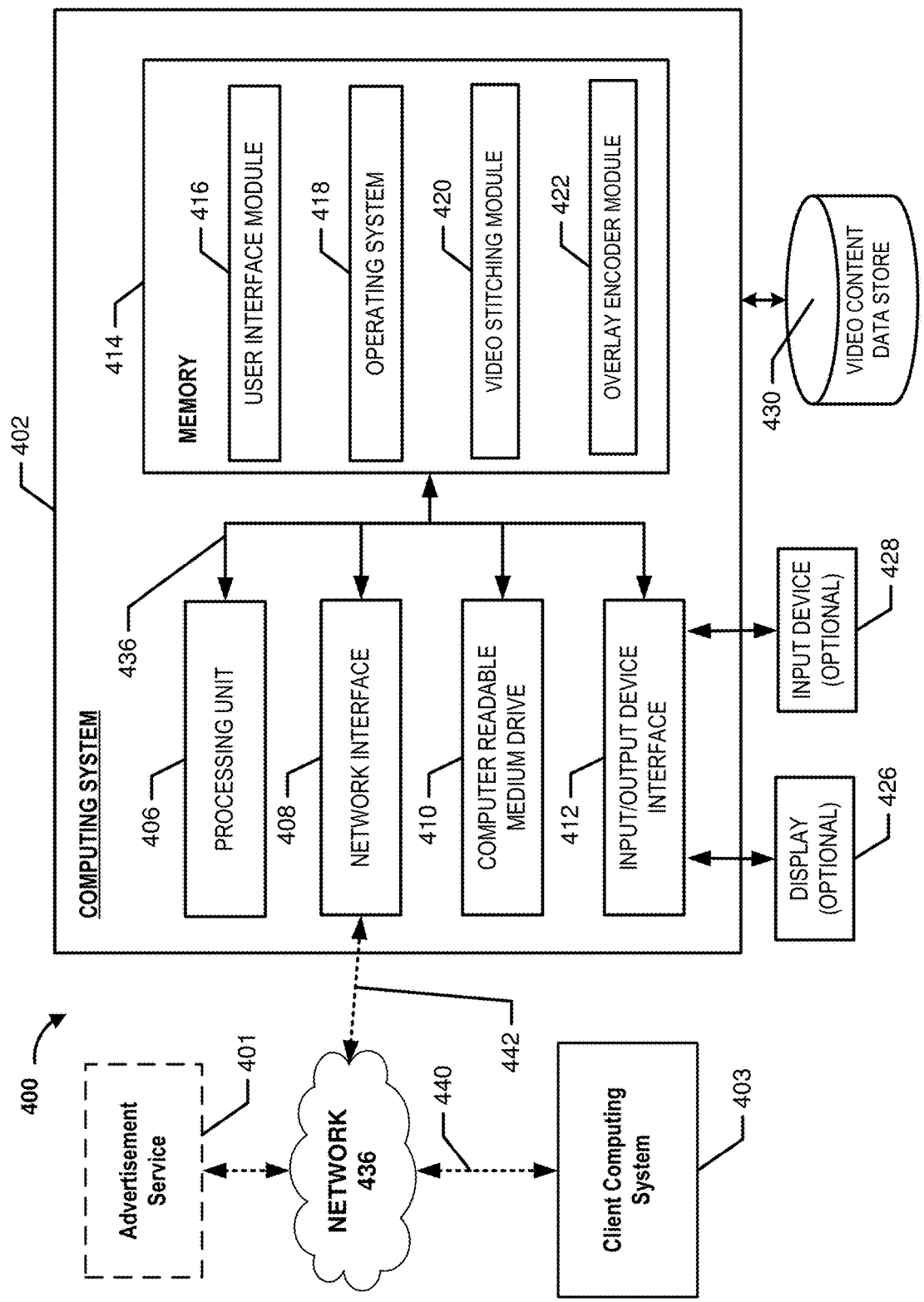
FIG. 4 is a system block diagram of a computing environment suitable for use in various embodiments of the present disclosure.

FIG. 4 illustrates a general architecture of a computing environment 400, according to some embodiments. As depicted in FIG. 4, the computing environment 400 may include a computing system 402. The general architecture of the computing system 402 may include an arrangement of computer hardware and software components used to implement aspects of the present disclosure. The computing system 402 may include many more (or fewer) elements than those shown in FIG. 4. It is not necessary, however, that all of these generally conventional elements be shown in order to provide an enabling disclosure. In some embodiments, the computing system 402 may be one instance of what is referred to above as a computing system or the SSAI platform or system (such as the SSAI system 104 or the SSAI system 304).

As illustrated, the computing system 402 includes a processing unit 406, a network interface 408, a computer readable medium drive 410, an input/output device interface 412, an optional display 426, and an optional input device 428, all of which may communicate with one another by way of a communication bus 436. The processing unit 406 may communicate to and from memory 414 and may provide output information for the optional display 426 via the input/output device interface 412. The input/output device interface 412 may also accept input from the optional input device 428, such as a keyboard, mouse, digital pen, microphone, touch screen, gesture recognition system, voice recognition system, or other input device known in the art.

The memory 414 may contain computer program instructions (grouped as modules or components in some embodiments) that the processing unit 406 may execute in order to implement one or more embodiments described herein. The memory 414 may generally include RAM, ROM and/or other persistent, auxiliary or non-transitory computer-readable media. The memory 414 may store an operating system 418 that provides computer program instructions for use by the processing unit 406 in the general administration and operation of the computing system 402. The memory 414 may further include computer program instructions and other information for implementing aspects of the present disclosure. For example, in one embodiment, the memory 414 may include a user interface module 416 that generates user interfaces (and/or instructions therefor) for display upon a computing system, e.g., via a navigation interface such as a browser or application installed on the computing system 402 or the client computing system 403.

In some embodiments, the memory 414 may include a video stitching module 420 and overlay encoder module 422, which may be executed by the processing unit 406 to perform operations according to various embodiments described herein. The modules 420 and/or 422 may access the data store 430 in order to retrieve data described above and/or store data, such as video segments with ad content integrated with original underlying video content. The data store may be part of the computing system 402, remote from the computing system 402, and/or may be a network-based service.

In some embodiments, the network interface 408 may provide connectivity to one or more networks or computing systems, and the processing unit 406 may receive information and instructions from other computing systems or services via one or more networks. In the example illustrated in FIG. 4, the network interface 408 may be in communication with a client computing system 403 via the network 436, such as the Internet. In particular, the computing system 402 may establish a communication link 442 with a network 436 (e.g., using known protocols) in order to send communications to the computing system 403 over the network 436. Similarly, the computing system 403 may send communications to the computing system 402 over the network 436 via a wired or wireless communication link 440. In some embodiments, the computing system 402 may additionally communicate via the network 436 with an optional third-party advertisement service 401, which may be used by the computing system 402 to retrieve advertisement content. Depending on the embodiment, the computing system 402 may be configured to retrieve advertisement data from either data store 430 or third-party advertisement service 401 depending on various information, such as the publisher, advertiser preferences, comparison of ad bid information, and/or other factors.

Those skilled in the art will recognize that the computing systems 402 and 303 may be any of a number of computing systems including, but not limited to, a laptop, a personal computer, a personal digital assistant (PDA), a hybrid PDA/mobile phone, a mobile phone, a smartphone, a wearable computing device, an electronic book reader, a digital media player, a tablet computer, a gaming console or controller, a kiosk, an augmented reality device, another wireless device, a set-top or other television box, one or more servers, and the like. The client computing system 403 may include similar hardware to that illustrated as being included in computing system 402, such as a display, processing unit, network interface, memory, operating system, etc. In some embodiments, the client computing system 403 may perform various steps described herein based in part on a browser or other application operating on the client computing system 403 executing code received over the network from the computing system 402, a publisher server, and/or other network-accessible server or service.

Figure 5:
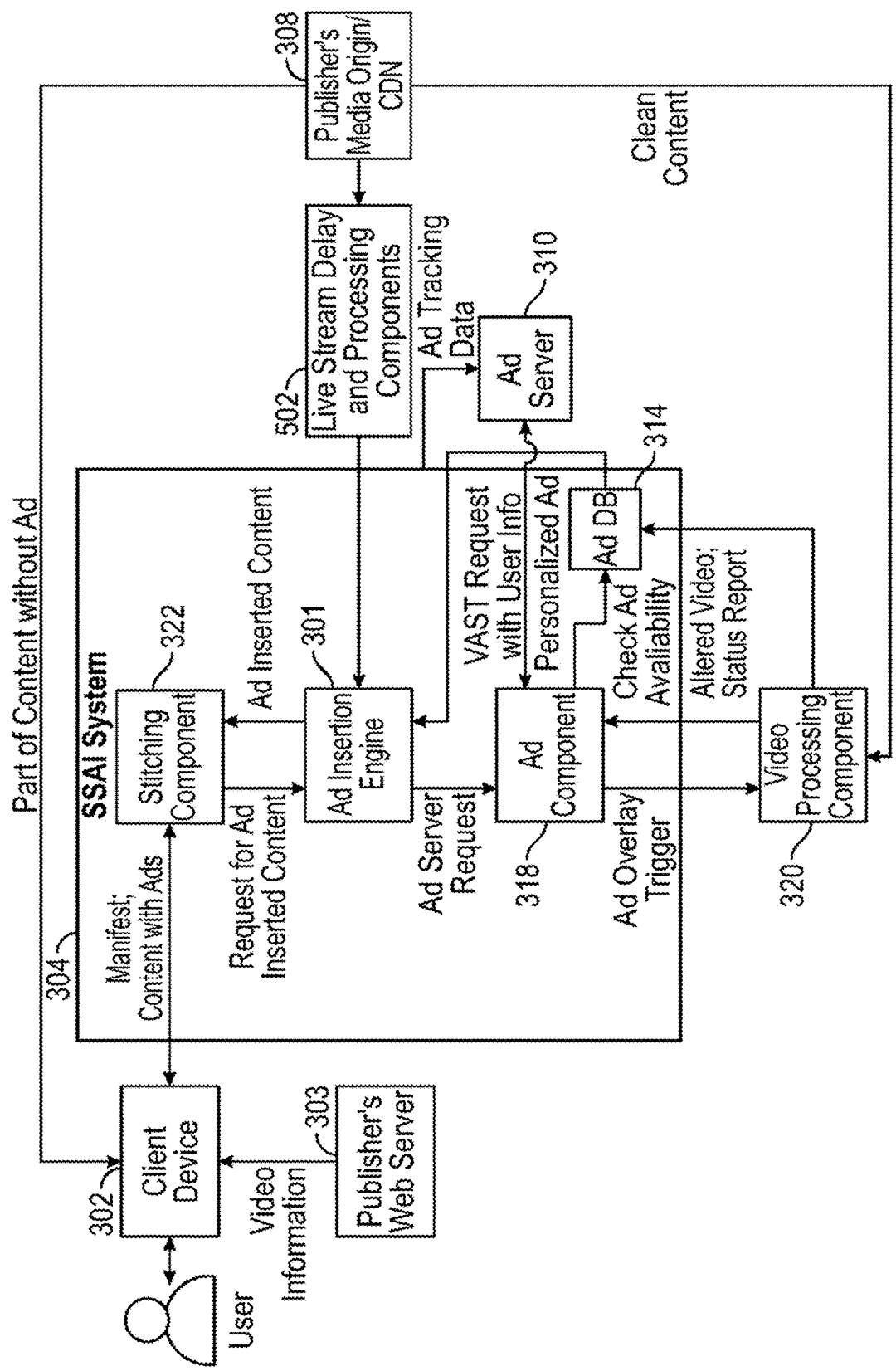
FIG. 5 illustrates example data flow, according to one embodiment, for delivering a live stream (such as in association with a live broadcast over the Internet) and associated overlay advertisement content or other supplemental content for playback on a client device.

FIG. 5 illustrates example data flow, according to one embodiment, for delivering a live stream (such as in association with a live broadcast over the Internet) and associated overlay advertisement content or other supplemental content for playback on a client device. In contrast to the data flow and components described above with respect to FIG. 3, the data flow and components shown in FIG. 5 may be implemented when the stream being requested by a client device is a live stream, such as in association with a live video broadcast where a video publisher is adding live recorded segments to the publisher's media origin or CDN in real time as client devices are viewing the live stream. This may occur, for example, in connection with a live broadcasted viewing of a sporting event, video game streaming, and/or other content that is filmed or otherwise produced substantially in real time as viewers view the content, such that the associated manifest is having segments added to the end in real time during user viewing as those segments first become available from the publisher's media origin or CDN.

With respect to streaming on-demand video content, such as when a viewing user requests to stream playback of a video that is already stored in its entirety at a publisher's media origin or CDN, the associated manifest will typically include an "end of content" entry at the end of the manifest that signals the stream has reached the end of the video. However, as is known in the art, this end of content entry is typically not present in the case of a live stream, and the manifest is instead updated on a continuous basis to add segments to the end of the manifest. For example, the streaming manifest may indicate a target duration for the live stream event, and the client device may request manifest updates on an ongoing basis during streaming playback (such as every 6 seconds, in one example) until reaching the target duration for the stream.

In the live streaming context, it is typically not preferred for the client device to have the most recently available/created segment as the base segment being played back, because there is an increased chance that playback will need to be temporarily paused for buffering purposes if the next segment is not delivered and processed for playback at the client device quickly enough. A particular client device may be configured to have a particular level of delay (such as low, medium or high), as is known in the art, to balance between being overly delayed (e.g., further behind the most recently created, "live" segment of the live stream than is needed to avoid buffering) and having a high risk of experiencing undesired buffering effects.

Separate from the above low, medium or high delay that may be configured on a client device according to known methods to minimize buffering effects, the live stream delay and processing components 502 shown in FIG. 5 provide for server-side delay of manifest data that causes an additional delay in playback across all users viewing a live video stream via the SSAI system 304. The delay provided by the live stream delay and processing components 502 is induced in order to provide the SSAI system 304 with time to generate replacement segments (such as segments featuring overlaid ad content) in the time between when the segment to be replaced is first available at the publisher's media origin or CDN 308 and when it will be reached for playback in a manifest delivered to a client device 302. In the illustrated embodiment, the live stream delay and processing components 502 do not access or store the video segments themselves, but rather temporarily store and provide for a delayed delivery of the manifest data, as will be further described below. The video segments themselves typically remain available from their original source at the publisher's media origin or CDN 308 for longer than the manifest delay induced by the live stream delay and processing components 502 (such delay may be, for example, 10-30 seconds, while a typical publisher may keep segments from a live stream available for at least a minute, such as from the media origin or CDN 308). In some embodiments, the SSAI system (or an operator of the SSAI system) may enforce requirements that the video segments remain available from the publisher's media origin for a certain minimum length of time based on the SSAI service's delay requirements in a given instance. For example, the publisher may grant the SSAI system permission to set configurations for an encoder utilized by the publisher in encoding video provided to the publisher's media origin, and the SSAI system may thereby set the duration that segments are maintained at the media origin to be at least as long as a latency requirement of the SSAI system in the given instance.

Figure 6:
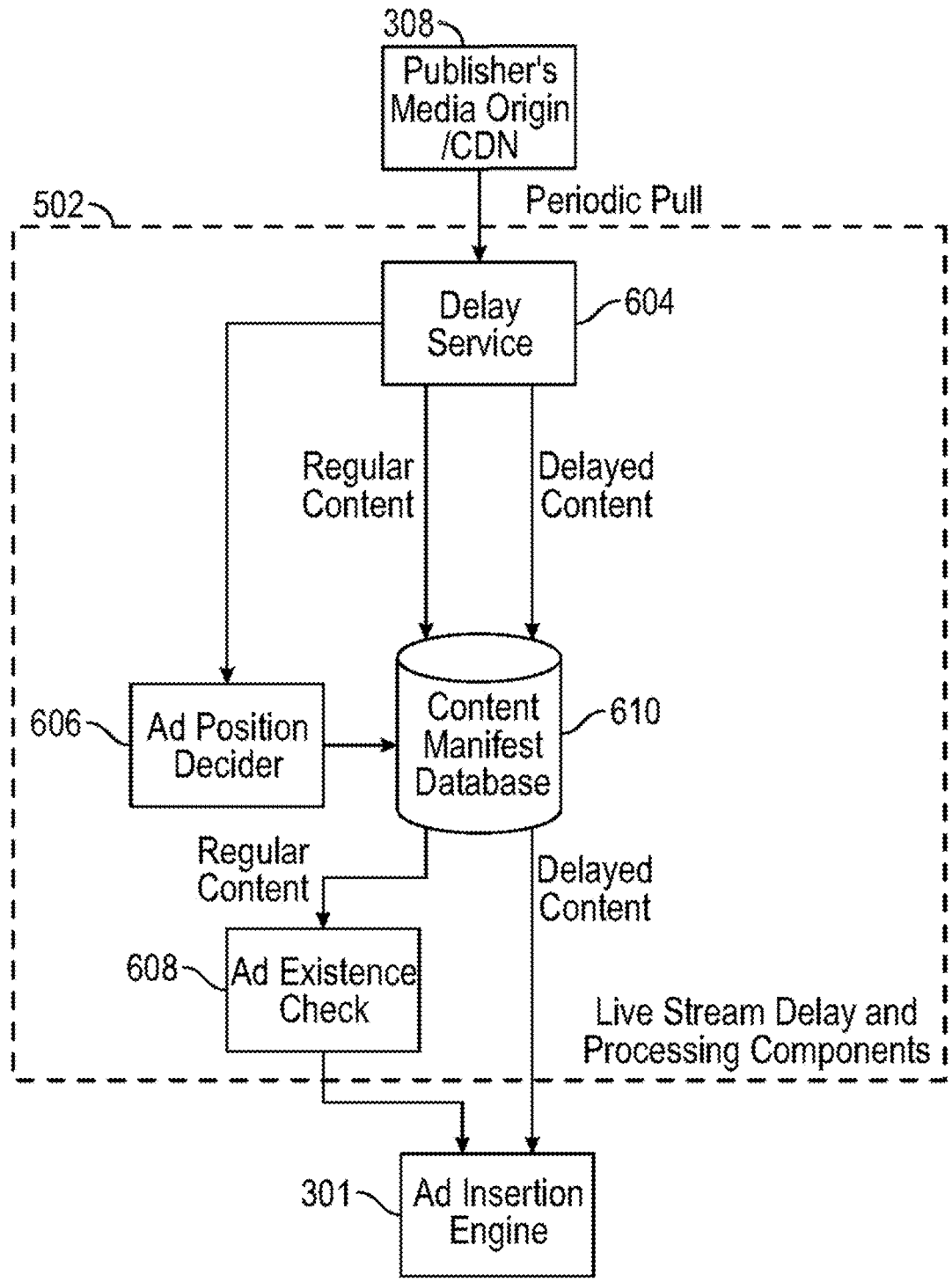
FIG. 6 illustrates additional sub-components and data flow for the live stream delay and processing components illustrated in FIG. 5.

As shown in FIG. 5, many of the featured components in this live streaming embodiment are the same as those described above with respect to non-live streams (such as streaming video on demand content that is available in full from its source prior to a particular user starting viewing of the stream), and are numbered the same as corresponding components is in FIG. 3 described above (e.g., SSAI system 304, ad insertion engine 301, stitching components 322, video processing component 320, etc.). Differences between the components in the live streaming embodiment of FIG. 5 and the earlier described embodiment of FIG. 3 are primarily in the addition of the live stream delay and processing components 502, as well as rearranging positioning of the ad position decider to operate in association with these delay components (the ad position decider will be shown in FIG. 6 in a more detailed view of the live stream delay and processing components 502). The live stream delay and processing components 502, which will be described in more detail below with respect to FIG. 6, are positioned in the data flow of FIG. 5 between the publisher's media origin 308 and the SSAI system 304, such that the SSAI system 304 receives manifest data via a delay service implemented by the live stream delay and processing components 502, rather than directly from the publisher's media origin 308. An additional difference (though not specifically illustrated in FIG. 5) in the live streaming embodiment and the earlier described embodiment of FIG. 3 is in the operation of the ad insertion engine 301. In some embodiments, the number of replacement segments created for ad insertion may differ from the number of segments that covered the same time period in the original video (e.g., three original segments making up 30 seconds of the original video may end up becoming four replacement segments lasting the same collective 30 seconds during ad insertion). Because the revised manifest should be configured to maintain a consecutive numbering of segment identifiers (e.g., a segment numbered 1001, followed by a segment number 1002, followed by segment numbered 1003, etc.), the ad insertion engine in live streaming embodiments may be configured to store a number for each user session that indicates the delta between the segment count or numbering of a post-ad segment in the revised manifest relative to the corresponding segment as numbered in the original manifest (e.g., the delta may be +1 in the above example where three original segments are replaced with four replacement segments). The revised manifest may thus renumber (relative to their original numbering at the media origin) segment identifiers for segments appearing after replacement segments in the revised manifest by adding the stored delta to the original segment number or identifier, thus maintaining consecutive numbering through all segments in the replacement manifest (without skipping or repeating any segment identifier).

As a high level example of the delay induced by the live stream delay and processing components 502, consider an example in which a live stream is started by a publisher that has set up the live stream to have advertisement content added in real time by the SSAI system 304. Suppose that the publisher begins the live feed (e.g., begins continuously adding new video segments to the publisher's media origin 308 and updating a live manifest available via the publisher's media origin 308 to reflect the latest segments added). Further suppose that the live stream delay and processing components 502 are made aware of the particular live stream's availability (e.g., either from the publisher alerting the SSAI system that the stream has begun or from a client device 302 requesting the stream) at a point at which the latest segment available from the media origin 308 is segment #110 (meaning segments #110 as identified in the manifest, not a numbered element of the figures of the present application). The live stream delay and processing components 502 may then begin continuously accessing the manifest updates from the media origin 308 and feeding both the "live" manifest data and manifest data on a set delay (e.g., an amount of delay estimated to be sufficient to generate replacement segments as discussed above).

For example, as will be discussed further below, at a given time soon after the live stream delay and processing components 502 begins accessing the manifest from the media origin 308, the live stream delay and processing components 502 may provide the SSAI system with continuous manifest updates on a set delay (e.g., sending manifest data listing segments #90-107 for processing and forwarding on the client devices) as well as the most recent live manifest updates (e.g., sending manifest data listing segment #110 for the SSAI system to potentially begin generating an ad-overlay replacement version of segment #110). When a client device 302 soon after reaches the point in their delayed manifest playback that results in the client device 302 requesting the segment that follows segment #109, the SSAI system 304 may return location data for a modified segment #110 (e.g., including an ad overlay) if that replacement segment is ready (e.g., has been created by the SSAI system 304 and video processing component 320) or may return the original segment #110 location information (e.g., at the publisher's media origin 308) if the replacement segment is not ready (or the SSAI system 304 otherwise determines not to send the ad-containing replacement segment to the particular user). This process will be further described below with respect to FIGS. 6 and 7.

FIG. 6 illustrates additional sub-components and data flow for the live stream delay and processing components illustrated in FIG. 5. As illustrated, the live stream delay and processing components 502 may include, in some embodiments, a delay service 604 (which may be a separate server from the SSAI system, or may be implemented by the SSAI system). The live stream delay and processing components 502 may further include an ad position decider 606, content manifest database 610, and ad existence check component 608, all of which may be part of the SSAI system 304 or separate from (and in communication with) the SSAI system 304, depending on the embodiment.

As shown in the data flow of FIG. 6, the delay service 604 may periodically pull updated manifest data from the publisher's media origin 308. The regular content (which may refer to the most recent manifest content that the publisher's media origin 308 would deliver to a typical client device viewing a substantially "live" segment of the live stream) may be passed to an ad position decider 606 and content manifest database 610 as it becomes available from the media origin 308. As discussed above with respect to other embodiments, the ad position decider 606 may analyze the video data of the provided segments from the manifest and determine ad positions (such as timestamps or other position information) at which an advertisement or other supplemental content should be added. The delay service may additionally provide delayed content to the content manifest database (such as the segment identifiers from the manifest delayed by 10 seconds relative to the most recent live segments), which may be accomplished in part by the delay service continually temporarily caching the live manifest content and delivering it to the content manifest database 610 on a set (configurable) delay.

The set amount of delay imposed by the delay service 604 for the delayed content stream may be set based on, for example, the estimated time to insert revised segment information into the manifest before delivery to a client device, and the time for the SSAI system to generate the actual video data of replacement segments for an ad (which may depend on video resolution, length of ad, and/or other factors). In some embodiments, the delay may be set based on the amount of time needed for creation of replacement segments for the highest resolution available for the stream, even though lower resolution versions of the replacement segments (such as those to be delivered to client devices with relatively low bandwidth network connections) may take substantially less time for the SSAI system to create than the length of the delay induced by the delay service.

As further illustrated in FIG. 6, the regular (substantially live) manifest content may continually be accessed from the content manifest database 610 by the ad existence check component 608, which may work in cooperation with the ad insertion engine 301 to determine whether an ad is available to insert (e.g., in a point within the stream previously identified by the ad position decider 606). If an ad should be inserted and is available to insert, the ad insertion engine 301 may begin the SSAI system's processes for generating replacement segments to include the ad content (similar to methods discussed above in the on-demand stream context, and further described below with respect to FIG. 7). While the regular content is continuously processed in this manner, the ad insertion engine 301 may process the delayed content from the content manifest database 610 and either pass the unaltered delayed manifest data to client devices or replace the appropriate segments in a revised manifest to be delivered to one or more client devices, where the replacement segments are those ad-containing segments that have been created by the SSAI system in the short window of time (such as 10 seconds) of the delay between when a given segment number appears in the regular content stream and when it appears in the delayed content stream. This process will now be further described below with respect to FIG. 7.

Figure 7:
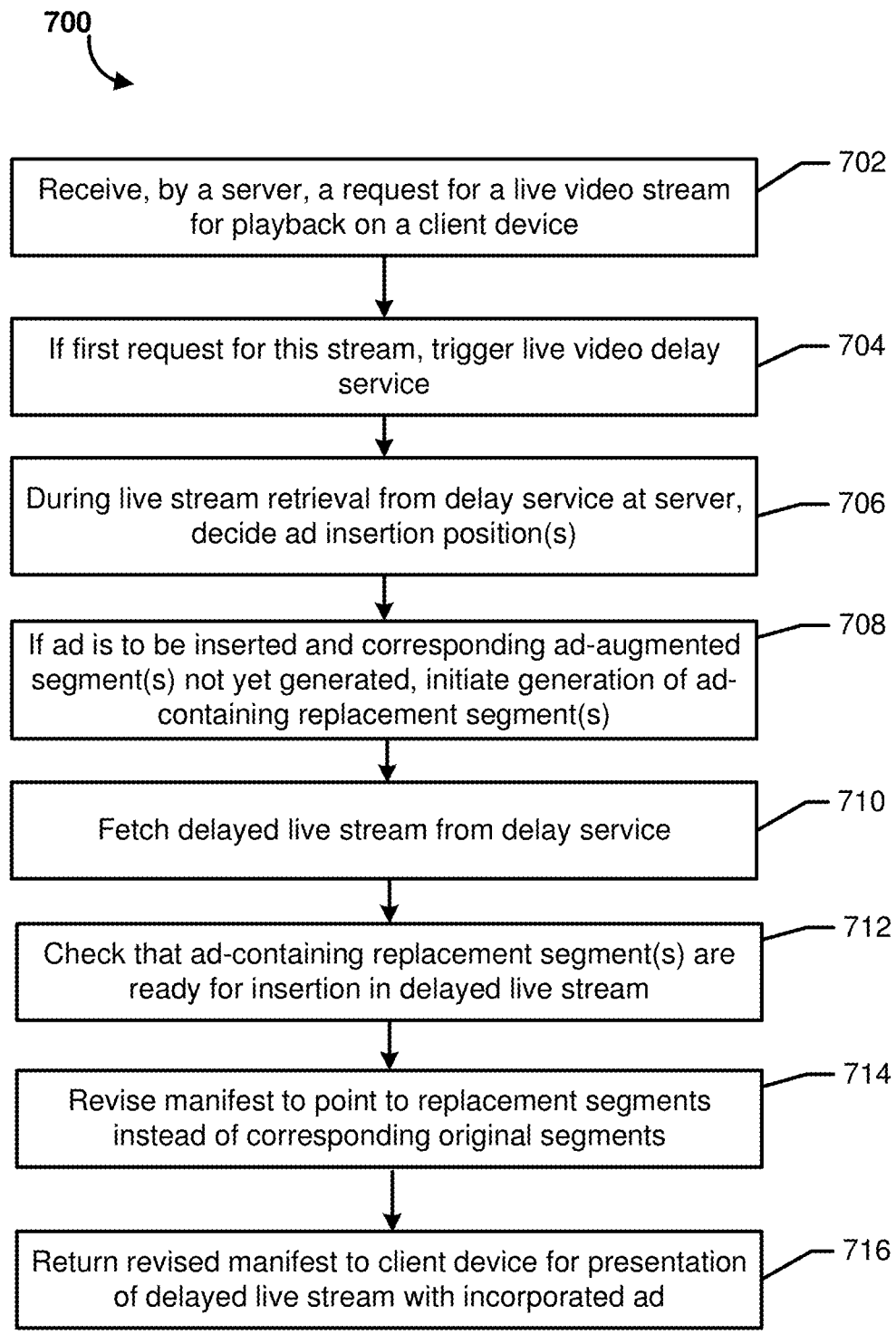
FIG. 7 is a flow diagram of an illustrative method for providing live streaming video for playback with added advertisement or other supplemental content to a client device after introducing a short server-side delay to provide time to generate the overlay or other replacement content at a server.

FIG. 7 is a flow diagram of an illustrative method 700 for providing live streaming video for playback with added advertisement or other supplemental content to a client device after introducing a short server-side delay to provide time to generate the overlay or other replacement content at a server. In contrast to method 200 described above, the method 700 may be implemented when the stream being requested by a client device is a live stream, such as in association with a live video broadcast where a video publisher is adding live recorded segments to the publisher's media origin or CDN in real time as client devices are viewing the live stream. The illustrative method 700 may be implemented by a server or platform, such as SSAI system (as shown and described with respect to SSAI system 104 or 304 above), by computing system 302 described above, or by a number of computing systems performing different blocks (such as blocks being performed by the live streaming delay and processing components 502). For ease of description, the blocks will be described below as being performed by the SSAI platform and/or components of the live streaming delay and processing components 502 (which may individually or collectively be referenced as a computing system below).

At block 702, the SSAI system may receive a request for a live video stream for playback on a client device. For example, the request may be received via a URL request from a client device for a URL hosted by the SSAI system that has been previously associated by the video stream publisher or host with a live stream available via the publisher's media origin or CDN.

At block 704, the SSAI system may check whether this is the first request that the SSAI system has received for this stream (from any client device or other system, such as the publisher system) and if so may then trigger the live video delay implemented by the delay service 604 for the requested stream. If instead another device has previously requested this same stream through the SSAI system, then the SSAI system will have previously triggered the delay service's processing of the stream manifest, such that delayed manifest content will already be available for this stream from the content manifest database 610. If this is the first client requesting the given stream via the SSAI system, and the SSAI system was not made aware that the stream had started previously via another source (such as from the publisher), this particular client's stream playback may have an initial delay imposed equal to the delay service's time delay setting. For example, if there is not yet delayed manifest content available for this stream in the content manifest database 610, the client device may be shown a "stream starting soon" message, a loading screen, and/or other video content (e.g., a pre-roll ad, an intro video segment previously provided by the video's publisher, and/or other content) for the 10 seconds or other preset delay period until the delayed stream is available. If instead the stream was already being processed by the delay service 604 prior to this particular client requesting to view the stream, the client may begin viewing the delayed stream right away.

At block 706, the SSAI system may decide on one or more ad insertion positions within the regular (non-delayed) stream content. Manners of selecting an ad position and corresponding ad have been discussed above with respect to other embodiments. In some embodiments, this block may be performed by the ad position decider 606, as discussed above. Ad positions for additional ads to be supplemented into the stream content may be determined on a continuous basis as constantly updating live stream content is retrieved from the publisher's media origin or CDN.

At block 708, if an ad was determined to be inserted (at block 706 above) and a corresponding set of one or more consecutive ad-augmented segment(s) have not yet been generated, the SSAI system may initiate generation of the one or more ad-containing replacement segments. For example, as discussed above with respect to other embodiments, the ad position decider may have designated a timestamp in the video at which an advertisement should be inserted as overlay content or other content integrated within frames of the video. If the given original video segments have not been previously modified for the selected ad, the platform may retrieve the relevant original video portion(s) from the video in which to insert overlay content or other supplemental content. The relevant portion(s) of the original video may be retrieved as a set of consecutive chunks or segments (e.g., based on URL(s) or other segment information in the manifest). As discussed above, the replacement content may be generated using an overlay encoder of the SSAI system that receives the relevant original video segments of the stream as one input, and receives an advertisement image or video as a second input, and outputs a replacement fragment or section of the original video that incorporates the advertisement content.

Block 710 may occur with respect to older segments of the stream in parallel with the SSAI system's augmentation of newer segments of the stream at block 708 above. At this block 710, the SSAI system may fetch or receive the delayed stream manifest data from the delay service 604 (such as via the content manifest database 610, as discussed above). For example, in an embodiment in which the delay service imposes a 30 second delay to provide time for ad-augmented segment creation by the SSAI system, the manifest data received at block 710 may indicate that the "current" (but actually delayed) segment is a segment from approximately 30 seconds ago in the true live stream.

At block 712, the SSAI system may identify that a segment from the received delayed stream manifest was designated previously by the ad position decider to be augmented with an advertisement. The SSAI system may check whether the ad-containing replacement segment(s) (which the SSAI system has been creating during the delay period) are ready for insertion in the delayed live stream to be delivered to one or more client devices. If ad-containing replacement segments are not yet prepared, the SSAI system may simply keep the original unaltered segments in the manifest delivered to the particular client device(s). If instead the ad-containing replacement segments have been generated and are complete, the SSAI system, at block 714, may revise the delayed manifest to point to the replacement segments instead of the corresponding original segments, as discussed above with respect to other embodiments.

It will be appreciated that different client devices watching the live stream may receive different ads, and that whether a given client device receives an ad-containing replacement segment may depend on the refresh rate, resolution and/or delay configured on the client side for a particular viewing device. For example, one client watching a particular live feed configured with a low client-side delay and a high display resolution may not receive an ad because the SSAI system did not have the high resolution replacement segments generated yet when the given client device requested the corresponding manifest update, whereas a different client device that is viewing slightly further behind in the delayed stream and/or at a lower resolution may receive an ad at the same playback point in the stream's video content.

At block 716, the SSAI system provides the revised manifest data to one or more client devices for presentation at the client device(s) of the delayed live stream, including the incorporated ad in instances where replacement segments were inserted by the SSAI system above. The blocks of FIG. 7 may then repeat and/or operate in a number of parallel instances as the live stream content continues to update and additional ads are inserted in subsequent portions of the stream (and/or as additional requests are received from new client devices to view the same live stream). According to some embodiments, the illustrative method 700 may end once the publisher ends the live stream or no client devices are viewing the live stream.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer system comprising:
    memory; and
    one or more processors in communication with the memory and configured to:
        receive, from a client device over a network, a request to view a live video stream on the client device;
        access a delay service that is in communication with a media origin server, wherein the media origin server hosts video data and associated manifest data for the live video stream;
        receive, from the delay service, first and second feeds of continuously updated manifest data associated with the live video stream, wherein the first feed of manifest data comprises live manifest data from the media origin server, wherein the second feed of manifest data comprises delayed manifest data that has been delayed by the delay service for a predetermined time relative to when the delayed manifest data was first available from the media origin server, wherein the predetermined time is less than one minute;

begin passing initial manifest data to the client device to initiate streaming video playback on the client device, wherein the initial manifest data is from the delayed manifest data;

based at least in part on analysis of at least one of the live manifest data or video data of video segments identified within the live manifest data, determine a first position in the live video stream to incorporate an overlaid advertisement;

based on the first position, retrieve one or more original video segments identified in the live manifest data in which to insert overlay content;

initiate generation of one or more replacement video segments, wherein the one or more replacement video segments depict at least portions of the advertisement content overlaid over video content from the one or more original video segments;

prior to or when the delayed manifest data in the second feed reaches the first position, confirm that at least a first replacement segment of the one or more replacement segments has been generated and is ready for delivery to the client device;

generate revised manifest data that includes references to the replacement video segments instead of corresponding original segments originally included in the second feed of delayed manifest data; and send, over the network, the revised manifest data to the client device, such that the revised manifest data causes the client device to present a delayed version of the live video stream with at least portions of the advertisement content overlaid within portions of the live video stream.

2. The computer system of claim 1, wherein the advertisement content is selected based at least in part on information regarding at least one of the client device or a user of the client device.

3. The computer system of claim 1, wherein the one or more processors are further configured to, prior to receiving at least the second feed from the delay service:

based on a determination that the live video stream has not been accessed from the media origin server by the delay service prior to the request from the client device, initiate processing of the live video stream by the delay service, wherein the second feed comprising the delayed manifest data is not received from the delay service until an amount of time at least equal to the predetermined time has passed since the processing of the live video stream by the delay service was initiated.

4. The computer system of claim 1, wherein generation of the one or more replacement video segments comprises, for each of a plurality of individual frames within the one or more original video segments, replacing some but not all pixels in the individual frame with pixels of the advertisement content.

5. The computer system of claim 1, wherein the one or more processors are further configured to:

determine that the one or more replacement video segments have not yet been generated when requested by a second client device that has reached the first position during streaming a delayed version of the live video stream; and based on the determining that the one or more replacement video segments are not yet generated, send to the second client device original manifest data identifying the one or more original video segments instead of the revised manifest data that includes references to the replacement video segments.

6. The computer system of claim 1, wherein the revised manifest data is sent to the client device in a format comprising one of (a) a HTTP Live Streaming (HLS) manifest or (b) a Dynamic Adaptive Streaming over HTTP (DASH) manifest.

7. The computer system of claim 1, wherein the at least portions of the advertisement content overlaid within portions of the live video stream appear when presented by the client device as a translucent overlay such that original video content from the live video stream as originally stored at the media origin server is at least partly visible beneath the advertisement content.

8. The computer system of claim 1, wherein beginning passing the initial manifest data to the client device comprises sending a manifest file to the client device, wherein sending the revised manifest data to the client device comprises updating the manifest file to append additional video segment entries as the live video stream progresses.

9. The computer system of claim 1, wherein the initial manifest data passed to the client device causes the client device to retrieve video segments from the media origin server, wherein at least a portion of the revised manifest data causes the client device to retrieve the replacement video segments from the computer system rather than corresponding original segments from the media origin server.

10. The computer system of claim 1, wherein the predetermined time is determined such that the predetermined time is estimated by the system to be sufficient for the system to generate modified video comprising ad-containing replacement segments for portions of the live video stream.

11. A computer-implemented method comprising:

receiving, from a client device over a network, a request to view a live video stream on the client device;

accessing a delay service that is in communication with an original source of the live video stream, wherein the original source hosts video data and associated manifest data for the live video stream;

receiving, from the delay service, first and second feeds of regularly updated manifest data associated with the live video stream, wherein the first feed of manifest data comprises live manifest data from the original source, wherein the second feed of manifest data comprises delayed manifest data that has been delayed by the delay service for at least a set time relative to when the delayed manifest data was first available from the original source;

passing initial manifest data to the client device to initiate streaming video playback on the client device, wherein the initial manifest data is from the delayed manifest data;

based at least in part on analysis of at least one of the live manifest data or video data of video segments identified within the live manifest data, determining a first position in the live video stream to incorporate supplemental content;

based on the first position, retrieving one or more original video segments identified in the live manifest data in which to insert the supplemental content;

initiating generation of one or more replacement video segments, wherein the one or more replacement video segments depict at least portions of the supplemental content as well as portions of video content from the one or more original video segments;

prior to or when the delayed manifest data in the second feed reaches the first position, checking that at least a first replacement segment of the one or more replacement segments has been generated;

generating revised manifest data that includes references to the replacement video segments instead of corresponding original segments originally included in the second feed of delayed manifest data; and sending, over the network, the revised manifest data to the client device, such that the revised manifest data causes the client device to present a delayed version of the live video stream with at least portions of the supplemental content presented within portions of the live video stream.

12. The computer-implemented method of claim 11, wherein sending the revised manifest data to the client device causes a video player operating on the client device to present in sequence: (a) a first original portion of video as stored at the original source and identified in the delayed manifest data, then (b) a second portion of the video from the delayed manifest data that has been modified relative to its state at the original source to include overlaid supplemental content within the second portion, and then (c) a third original portion of the video as stored at the original source and identified in the delayed manifest data.

13. The computer-implemented method of claim 11, wherein generating the one or more replacement video segments comprises including unmodified original audio from the one or more original video segments in the one or more replacement segments.

14. The computer-implemented method of claim 11 further comprising:

requesting the supplemental content from a third party advertisement service, wherein the supplemental content is advertisement content; and reporting to the third party advertisement service when the one or more replacement segments that include the supplemental content are sent to the client device for playback.

15. The computer-implemented method of claim 14, wherein the reporting to the third party advertisement service comprises sending tracking pixel data from a server to the third party advertisement service, wherein the tracking pixel data is not provided to the client device.

16. The computer-implemented method of claim 11, wherein the supplemental content is selected based at least in part on information regarding a user of the client device.

17. The computer-implemented method of claim 11 further comprising:

generating a second set of replacement video segments for presenting to a second client device viewing the live video stream on a same or different delay than the client device, wherein the second set of replacement video segments includes different supplemental content than the supplemental content selected for the client device;

generating second revised manifest data that includes references to the second set of replacement video segments instead of the corresponding original segments originally included in the second feed of delayed manifest data; and sending, over the network, the second revised manifest data to the second client device, such that the second revised manifest data causes the second client device to present a second delayed version of the live video stream with at least portions of the different supplemental content presented within portions of the live video stream.

18. The computer-implemented method of claim 11, wherein the delay service has been caching manifest data from the original source for the live video stream prior to receiving the request from the client device to view the live video stream, wherein an amount of time between when the request is received from the client device and when the client device begins displaying video content from the initial manifest data is less than the set time of the delay imposed on the delayed manifest data by the delay service.

19. The computer-implemented method of claim 11, wherein the revised manifest data causes the client device to present the delayed version of the live video stream with at least portions of the supplemental content presented within portions of the live video stream in a manner such that there is no visually perceptible playback difference relative to original video content of the live video stream other than visible presence of the supplemental content.

20. The computer-implemented method of claim 11 further comprising synchronizing original audio of the live video stream to coincide with corresponding replacement video segments without otherwise modifying the original audio.

* * * * *